(12) United States Patent
Lepidi et al.

(10) Patent No.: US 12,115,869 B2
(45) Date of Patent: Oct. 15, 2024

(54) CURRENT CONTROL DURING DC FAST CHARGING

(71) Applicant: Ford Global Technologies, LLC, Dearborn, MI (US)

(72) Inventors: Gary Lepidi, Riverview, MI (US); Zachary March, Highlands Ranch, CO (US); Justin Barsano, Hazel Park, MI (US); Matthew Allen Tomai, Ferndale, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 373 days.

(21) Appl. No.: 17/552,104

(22) Filed: Dec. 15, 2021

(65) Prior Publication Data

US 2023/0182587 A1 Jun. 15, 2023

(51) Int. Cl.
*B60L 53/10* (2019.01)
*B60L 53/62* (2019.01)

(52) U.S. Cl.
CPC .............. *B60L 53/11* (2019.02); *B60L 53/62* (2019.02)

(58) Field of Classification Search
CPC .... B60L 53/11; B60L 53/62; B60L 2240/549; B60L 2240/80; B60L 53/66; B60L 53/14; B60L 53/20; Y02T 10/70; Y02T 10/7072
USPC ........................................................ 320/109
See application file for complete search history.

(56) References Cited

U.S. PATENT DOCUMENTS

| 9,475,480 B2 | 10/2016 | Ishishita et al. |
| 2016/0214502 A1 | 7/2016 | Perkins |
| 2020/0062124 A1 | 2/2020 | Haputhanthri et al. |
| 2023/0264573 A1* | 8/2023 | Hein ........................ B60L 53/11 320/109 |

FOREIGN PATENT DOCUMENTS

| JP | 5416664 B2 | 2/2014 |
| WO | 2012138673 A2 | 10/2012 |

* cited by examiner

*Primary Examiner* — Paul Dinh
(74) *Attorney, Agent, or Firm* — David B. Kelley; Brooks Kushman P.C.

(57) ABSTRACT

One or more controllers limit direct current output by electric vehicle supply equipment to charge a traction battery of a vehicle according to a filtered current squared capacity remaining of the traction battery, which may be defined for a window of time having a predefined duration and be based on an average current input to or output from the traction battery.

18 Claims, 2 Drawing Sheets

CURRENT CONTROL DURING DC FAST CHARGING

TECHNICAL FIELD

This disclosure relates to power systems for automotive vehicles.

BACKGROUND

Electrified vehicles may include traction and auxiliary batteries. The traction battery may be used to power one or more electric machines for propulsion.

SUMMARY

A vehicle includes a traction battery and one or more controllers that command electric vehicle supply equipment to reduce a magnitude of direct current being supplied to charge the traction battery by an amount that is based on an average magnitude of current input to or output from the traction battery during a window of time having a predefined duration.

A method includes commanding electric vehicle supply equipment to reduce a magnitude of direct current being supplied to charge a traction battery of a vehicle by an amount that is based on an average magnitude of current input to or output from the traction battery during a window of time having a predefined duration such that as the average magnitude increases, the amount increases.

A power system for a vehicle includes one or more controllers programmed to limit direct current output by electric vehicle supply equipment to charge a traction battery of the vehicle according to a filtered current squared capacity remaining of the traction battery.

DETAILED DESCRIPTION

Embodiments are described herein. It is to be understood, however, that the disclosed embodiments are merely examples and other embodiments may take various and alternative forms. The figures are not necessarily to scale. Some features could be exaggerated or minimized to show details of particular components. Therefore, specific structural and functional details disclosed herein are not to be interpreted as limiting, but merely as a representative basis for teaching one skilled in the art.

Various features illustrated and described with reference to any one of the figures may be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Figure 1:
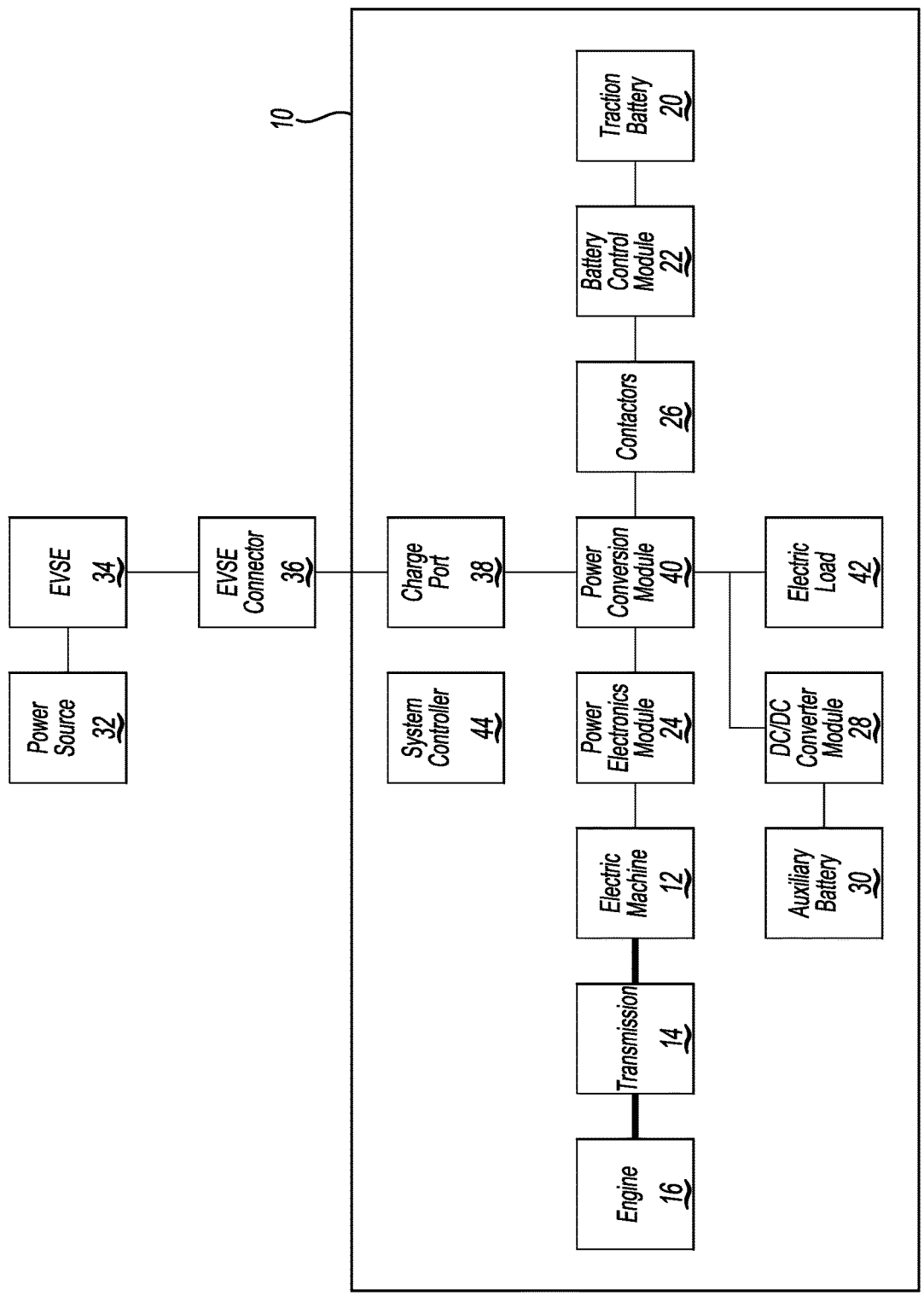
FIG. 1 is a schematic diagram of a vehicle.

Referring to FIG. 1, a plug-in hybrid-electric vehicle 10 may include one or more electric machines (electric motors) 12 mechanically coupled to a transmission 14. The electric machine 12 may be capable of operating as a motor or a generator. In addition, the transmission 14 is mechanically coupled to an engine 16. The transmission 14 is also mechanically coupled to a drive shaft that is mechanically coupled to wheels. The electric machine 12 may provide propulsion and slowing capability when the engine 16 is turned on or off. The electric machine 12 may also act as a generator and provide fuel economy benefits by recovering energy that would otherwise be lost as friction braking heat. The electric machine 12 may also reduce vehicle emissions by allowing the engine 16 to operate at more efficient speeds and allowing the hybrid-electric vehicle 10 to be operated in electric mode with the engine 16 off under certain conditions.

A traction battery 20 stores energy that may be used by the electric machine 12. The traction battery 20 may include a plurality of battery cells connected in series or parallel to provide high voltage DC output. In one example, the battery cells may be permanently fixed to a housing of the traction battery 20 and not removable. Alternatively, the battery cells may be individually removable to allow the user to replace one or more aged or worn cells such that the general life of the traction battery 20 maybe prolonged. The term battery cell is used generally herein, and may refer to a single battery cell, an array of battery cells, or the like.

The traction battery 20 may be electrically coupled to a battery control module 22 that is provided with one or more processors and software applications configured to monitor and control various operations of the traction battery 20. The traction battery 20 may be further electrically coupled to a power electronics module 24. The power electronics module 24 may also be referred to as a power inverter. One or more contactors 26 may isolate the traction battery 20 and battery control module 22 from other components when opened and couple the traction battery 20 and battery control module 22 to other components when closed. The power electronics module 24 may also be electrically coupled to the electric machine 12 and provide the ability to bi-directionally transfer energy between the traction battery 20 and electric machine 12. For example, the traction battery 20 may provide DC voltage while the electric machine 12 may operate using three-phase AC current. The power electronics module 24 may convert the DC voltage to three-phase AC current for use by the electric machine 12. In regenerative mode, the power electronics module 24 may convert the three-phase AC current from the electric machine 12 acting as a generator to DC voltage compatible with the traction battery 20.

The description herein is equally applicable to a pure electric vehicle. For a pure electric vehicle, the transmission 14 may be a gear box connected to the electric machine 12 and the engine 16 may not be present.

In addition to providing energy for propulsion, the traction battery 20 may provide energy for other vehicle electrical systems. The vehicle 10, for example, may include a DC/DC converter module 28 that converts high voltage DC output of the traction battery 20 to low voltage DC supply that is compatible with other low-voltage vehicle loads. An output of the DC/DC converter module 28 may be electrically coupled to an auxiliary battery 30 (e.g., 12V battery).

The traction battery 20 may be recharged by an external power source 32 (e.g., a connection to an electrical outlet, an electrical power distribution network or grid, etc.). The external power source 32 may be electrically coupled to electric vehicle supply equipment (EVSE) 34. The EVSE 34 may provide circuitry and controls to manage the transfer of energy between the power source 32 and the vehicle 10. The external power source 32 may provide DC or AC electric power to the EVSE 34. The EVSE 34 may have a charge connector 36 for plugging into a charge port 38 of the vehicle 10. The charge port 38 may be any type of port configured to transfer power from the EVSE 36 to the vehicle 10. The charge port 38 may be electrically coupled to a charger or on-board power conversion module 40. The power conversion module 40 may condition the power supplied from the EVSE 34 to provide the proper voltage and current levels to the traction battery 20. The power conversion module 40 may interface with the EVSE 34 to coordinate the delivery of power to the vehicle 10. The EVSE connector 36 may have pins that mate with corresponding recesses of the charge port 38. Alternatively, various components described as being electrically coupled may transfer power using wireless inductive coupling.

One or more electric loads 42 may be coupled to the high-voltage bus. The electric loads 42 may have an associated controller that operates and controls them when appropriate. Examples of electric loads 42 include a heating module, an air-conditioning module, or the like.

The various components discussed may have one or more associated controllers to control and monitor the operation of the components. The controllers may communicate via a serial bus (e.g., Controller Area Network (CAN)) or via discrete conductors. A system controller 44 may be present to coordinate the operation of the various components. The phrase system controller 44 is used generally herein, and may include one or more controller devices configured to perform various operations. For instance, the system controller 44 may be programmed to enable a powertrain control function to operate the powertrain of the vehicle 44. The system controller 44 may be further programmed to enable other functionality, as discussed below.

A strategy referred to as Filtered I-Squared (FIS) monitors the current utilization through the traction battery 20 over numerous time windows, so as not to exceed an amount of current-over-time to thermally manage components whose temperature is not monitored directly. The time windows may vary in length and overlap. For example, twelve consecutive five-second time windows may span a single 60-second time window. Five consecutive sixty-second time windows may span a single five-minute time window. Three consecutive ten-minute time windows may span a single thirty-minute time window, etc. The FIS value is thus proportional to the square of the current into or out of the traction battery 20. When the FIS utilization grows to a point where it is near its limits, the system controller 44 may remove power capability from the vehicle 10 to reduce the current draw through the traction battery 20 until the FIS utilization recovers. This strategy may create issues when plugging the vehicle 10 into a DC fast charge station immediately after a drive cycle and a high input current is applied before the FIS utilization recovers.

These issues can be addressed by slowly limiting the maximum charge current input while the FIS windows are utilized. The amount of FIS capacity remaining can be consumed quickly if the commanded DC fast charge current is not limited in order to allow the FIS capacity to recover. An optimal charge current can thus be selected to prevent complete FIS capacity depletion so that the highest charge current can be applied resulting in the shortest charge duration without exceeding the FIS limit of the hardware. A reduction in charge current shall also allow FIS capacity to recover with monitoring the input charge current and finding an optimal value to provide the fastest charge duration without affecting hardware. In one example, this is accomplished by monitoring the FIS utilization, looking up a maximum charge current limit as a function of the FIS utilization, and communicating this to the battery control module 22 to arbitrate a requested charge current from the EVSE 34.

Figure 2:
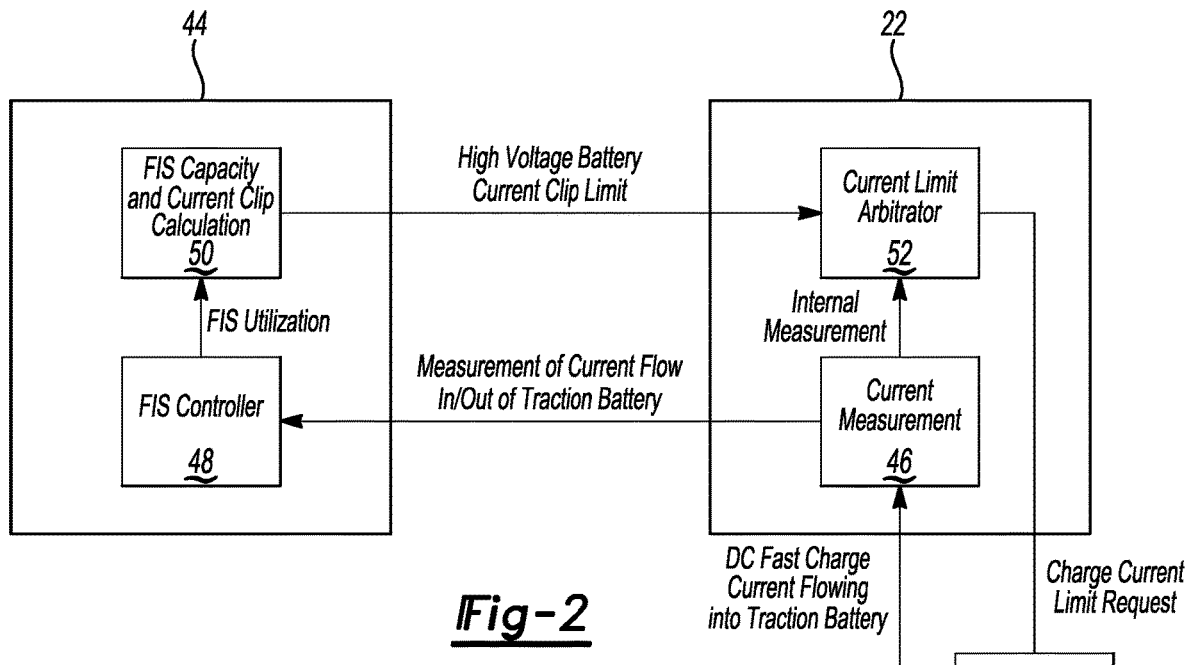
FIG. 2 is a schematic diagram of a portion of the vehicle of FIG. 1.

Referring to FIG. 2, the battery control module 22 includes a current measurement 46 (e.g., a sensor) arranged to measure current flow from the EVSE 34 for the traction battery 20. This measurement is forwarded to a FIS controller 48, which is implemented by the system controller 44 in this example, to determine the FIS utilization as a function of the square of the measured current. Given that multiple time windows of differing length may overlap, the FIS utilization for each window can be calculated according to the average current for that window, with the average value being squared to generate the FIS utilization for that window. The FIS controller 48 then forwards the FIS utilizations corresponding to the various length time windows to the FIS capacity and current clip calculation 50 functionality, which is also implemented by the system controller 44 in this example, to determine the difference between a maximum of the FIS utilizations and a maximum allowable FIS utilization. As an example, if a given maximum of the FIS utilizations is 20 and the maximum allowable FIS utilization is 85, the FIS capacity remaining is 65. If a given maximum FIS utilization is 85 and the maximum allowable FIS utilization is 85, the FIS capacity remaining is 0. And, if a given maximum FIS utilization is 0 and the maximum allowable FIS utilization is 85, the FIS capacity remaining is 85. The FIS capacity remaining can also be represented as a percentage. Continuing with the previous examples, a FIS capacity remaining of 65 can be represented as a FIS capacity remaining of 76% (65/85=0.76). A FIS capacity remaining of 0 can be represented as 0%. And, a FIS capacity remaining of 85 can be represented as 100% (85/85=1). Other techniques are also contemplated for determining FIS utilization and FIS capacity remaining.

The FIS capacity and current clip calculation 50, using the FIS capacity, then determines the amount by which current from the EVSE 34 should be reduced (or clipped). In some examples, a look-up table is used such that for a given FIS capacity, the current clip amount is predefined. A range of FIS capacity values (e.g., 30% to 100%) may have a 0 current clip amount associated therewith. That is, current from the EVSE 34 will not be reduced if the FIS capacity falls within this range. As the FIS capacity, in this example, falls below 30% however, the corresponding current clip amount will have a value greater than 0 such that maximum current from the EVSE 34 during DC fast charging will be reduced. Suitable calculations or other techniques are also contemplated for determining the current clip amounts.

The FIS capacity and current clip calculation 50 forwards the current clip amount to a current limit arbitrator 52, which is implemented by the battery control module 22. The current limit arbitrator 52 uses this data, along with data from the current measurement 46, to command the EVSE 34 to provide a certain amount maximum of current flow.

Figure 3:
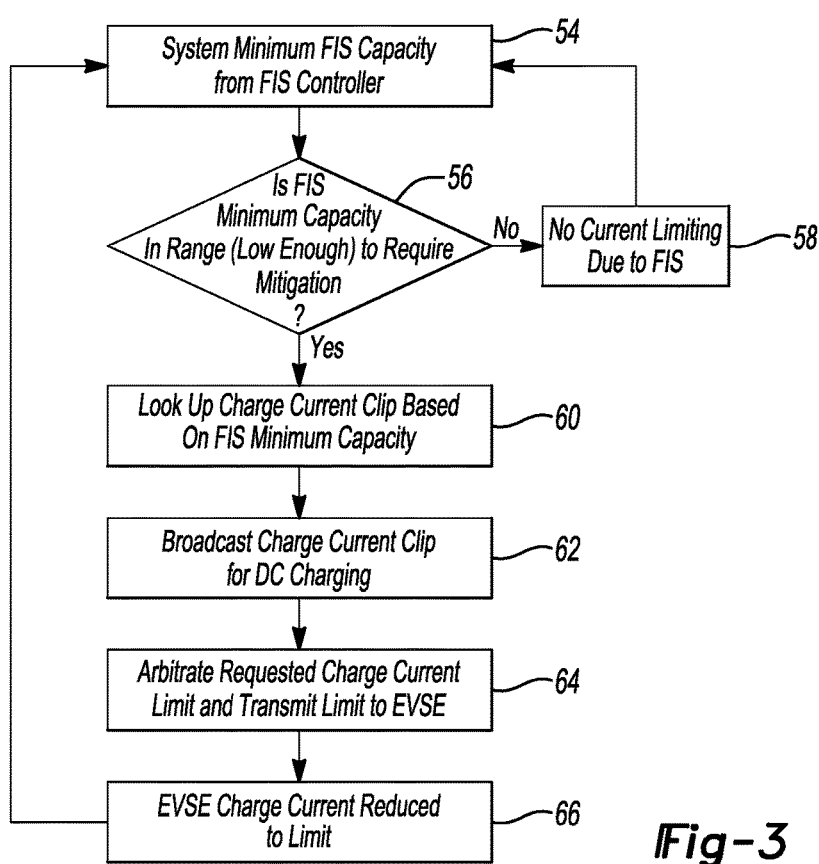
FIG. 3 is a flow chart of an algorithm for plug-in charging current control.

Referring to FIG. 3, a minimum FIS capacity is identified at operation 54. If several windows, techniques, and/or strategies are used to determine the FIS capacity at the same time, the one indicative of being the lowest is identified. At operation 56, it is determined whether the minimum FIS capacity is in the range that requires mitigation. As mention above, reductions in current may only take place once the capacity has fallen below a threshold value. If no, no current limiting due to FIS capacity is implemented at operation 58, and the algorithm returns to operation 54. If yes, the charge current clip amount is obtained at operation 60. At operation 62, the charge current clip amount is broadcast. At operation 64, the requested charge current limit is arbitrated and transmitted to the EVSE 34. At operation 66, the charge current is reduced to the limit.

The operations of FIGS. 2 and 3 can be performed in an on-going manner. As such, a feedback loop may be created in which the FIS capacity remaining is continually or periodically determined while a current limit is continually or periodically being forwarded to the EVSE 34. The effect can be that the FIS capacity remaining may continue to increase while the current limit decreases until the FIS capacity remaining crosses the threshold at which current reduction is no longer necessary.

The strategies contemplated thus pro-actively manage FIS utilization in challenging use cases. By slowly reducing the maximum charge current of the EVSE, 34, the vehicle 10 can prevent the FIS utilization from becoming too high during DC fast charge such that when a driver does charge immediately after a drive cycle, the vehicle 10 finds an optimal high charge current that does not deplete the FIS capacity remaining completely, to avoid an unacceptably long charge duration.

The algorithms, methods, or processes disclosed herein can be deliverable to or implemented by a computer, controller, or processing device, which can include any dedicated electronic control unit or programmable electronic control unit. Similarly, the algorithms, methods, or processes can be stored as data and instructions executable by a computer or controller in many forms including, but not limited to, information permanently stored on non-writable storage media such as read only memory devices and information alterably stored on writeable storage media such as compact discs, random access memory devices, or other magnetic and optical media. The algorithms, methods, or processes can also be implemented in software executable objects. Alternatively, the algorithms, methods, or processes can be embodied in whole or in part using suitable hardware components, such as application specific integrated circuits, field-programmable gate arrays, state machines, or other hardware components or devices, or a combination of firmware, hardware, and software components.

While exemplary embodiments are described above, it is not intended that these embodiments describe all possible forms encompassed by the claims. The words used in the specification are words of description rather than limitation, and it is understood that various changes may be made without departing from the spirit and scope of the disclosure. The terms controller and controllers, for example, can be used interchangeably.

As previously described, the features of various embodiments may be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics may be compromised to achieve desired overall system attributes, which depend on the specific application and implementation. These attributes may include, but are not limited to strength, durability, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and may be desirable for particular applications.

What is claimed is:

1. A vehicle comprising:
   a traction battery; and
   one or more controllers programmed to command electric vehicle supply equipment to reduce a magnitude of direct current being supplied to charge the traction battery by an amount that is based on an average magnitude of current input to or output from the traction battery during a window of time having a predefined duration such that capacity remaining of the traction battery does not fall below a predefined threshold value.

2. The vehicle of claim 1, wherein the capacity remaining is a filtered current squared capacity remaining.

3. The vehicle of claim 1, wherein the amount is based on a square of the average magnitude.

4. The vehicle of claim 1, wherein the average magnitude of the current input to or output from the traction battery during the window of time having the predefined duration is a maximum of a plurality of average magnitudes of current input to or output from the traction battery during a plurality of windows of time having predefined durations.

5. The vehicle of claim 4, wherein the predefined durations are different.

6. The vehicle of claim 4, wherein at least some of the plurality of windows are overlapping.

7. A method comprising:
   commanding electric vehicle supply equipment to reduce a magnitude of direct current being supplied to charge a traction battery of a vehicle by an amount that is based on an average magnitude of current input to or output from the traction battery during a window of time having a predefined duration such that as the average magnitude increases, the amount increases, wherein the commanding prevents a capacity remaining of the traction battery from falling below a predefined threshold value.

8. The method of claim 7, wherein the capacity remaining is a filtered current squared capacity remaining.

9. The method of claim 7, wherein the amount is based on a square of the average magnitude.

10. The method of claim 7, wherein the average magnitude of the current input to or output from the traction battery during the window of time having the predefined duration is a maximum of a plurality of average magnitudes of current input to or output from the traction battery during a plurality of windows of time having predefined durations.

11. The method of claim 10, wherein the predefined durations are different.

12. The method of claim 10, wherein at least some of the plurality of windows are overlapping.

13. A power system for a vehicle comprising:
    one or more controllers programmed to limit direct current output by electric vehicle supply equipment to charge a traction battery of the vehicle according to a filtered current squared capacity remaining of the traction battery.

14. The power system of claim 13, wherein the filtered current squared capacity remaining of the traction battery is defined for a window of time having a predefined duration.

15. The power system of claim 13, wherein the filtered current squared capacity remaining of the traction battery is based on an average current input to or output from the traction battery.

16. The power system of claim 13, wherein the filtered current squared capacity remaining corresponds to a maximum of a plurality of average magnitudes of current input to or output from the traction battery during a plurality of windows of time having predefined durations.

17. The power system of claim 16, wherein the predefined durations are different.

18. The power system of claim 16, wherein at least some of the plurality of windows are overlapping.

* * * * *